United States Patent [19]

Goodall et al.

[11] Patent Number: 4,513,338

[45] Date of Patent: Apr. 23, 1985

[54] WHIP ANTENNA HIGH VOLTAGE PROTECTION DEVICE

[75] Inventors: Steve R. Goodall, Ocean; Palemon W. Dubowicz; Donn V. Campbell, both of Eatontown, all of N.J.

[73] Assignee: The United States of America as represented by the Secretary of the Army, Washington, D.C.

[21] Appl. No.: 575,973

[22] Filed: Feb. 1, 1984

[51] Int. Cl.[3] .......... H02H 9/04

[52] U.S. Cl. .......... 361/1; 361/56; 361/118; 361/91; 343/900; 343/904; 343/749

[58] Field of Search .......... 361/56, 117, 118, 1, 361/91; 343/904, 900, 749, 745; 174/138 D, 138 A, 139, 5 R, 85

[56] References Cited

U.S. PATENT DOCUMENTS

| | | | |
|---|---|---|---|
| 2,681,412 | 6/1954 | Webster | 343/900 X |
| 3,852,757 | 12/1974 | Kaiser | 343/900 X |
| 4,092,646 | 5/1978 | Newington | 343/749 |
| 4,459,597 | 7/1984 | Blaese | 343/900 |

FOREIGN PATENT DOCUMENTS

| | | | |
|---|---|---|---|
| 2724906 | 12/1978 | Fed. Rep. of Germany | 343/900 |

*Primary Examiner*—Patrick R. Salce

*Attorney, Agent, or Firm*—Anthony T. Lane; Jeremiah G. Murray; Robert A. Maikis

[57] ABSTRACT

A high voltage protection device for protecting personnel from injury or death as well as damage to radios and vehicles when a whip antenna comes in contact with overhead high voltage power lines or the like and comprises a high voltage coaxial capacitance device which is coupled in series between the upper and lower section of a whip antenna. The capacitive reactance of the capacitance device is very high at power line frequencies and relatively low at RF frequencies. The capacitance element is comprised of two concentric cylindrical conductors formed in a fiberglass shell and separated from one another by a dielectric such as polytetra fluorethylene.

5 Claims, 3 Drawing Figures

WHIP ANTENNA HIGH VOLTAGE PROTECTION DEVICE

The invention described herein may be manufactured, used and licensed by or for the Government for governmental purposed without the payment of any royalties thereon or therefor.

FIELD OF THE INVENTION

This invention relates generally to means for protecting persons or things against electrical shocks and more particularly to means included in radio antennas for providing protection against high voltage contact with potentially dangerous power sources.

BACKGROUND OF THE INVENTION

Whip antennas currently used with portable radio equipment carried, for example, by vehicles normally cannot withstand high voltages exceeding 10 kilovolts. When such whip antennas are tall enough to come in contact with overhead power lines, catastrophic effects result, not only in the destruction of the antenna as well as damage to the radio and vehicle to which it is attached, but also subjects the personnel operating the equipment to possible injury or death.

Accordingly, it is an object of the present invention to provide high voltage protection for relatively long antennas.

It is another object of the invention to provide high voltage protection for vertically oriented whip antennas.

A further object of the invention is to provide protection for whip antennas coming into contact with overhead power lines and the like.

Still a further object of the invention is to provide high voltage protection for relatively long whip antennas and providing at least 20 kilovolts of insulation against undesired contact with high voltage power lines and other external high voltage sources.

SUMMARY

These and other objects are provided by a high voltage protective device for a whip antenna comprising a high voltage series capacitance device which is coupled intermediate the upper and lower sections of a whip antenna. The capacitance device comprises two eccentric cylindrical inner and outer conductors formed of an insulating fiberglass shell and separated from one another by a dielectric, such as polytetra fluorethylene. The capacitance element is inserted between the antenna sections to respectively contact the antenna conductor elements thereof and exhibits a very high capacitive reactance at power line frequencies, such as αHz, but a relatively low capacitive reactance at RF frequencies.

DETAILED DESCRIPTION OF THE PREFERRED EMBODIMENT

Figure 1:
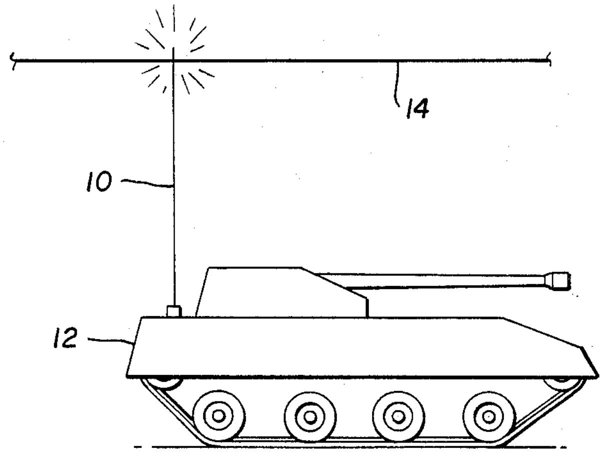
FIG. 1 is a diagram illustrative of the operational environment of the subject invention.

Referring now to FIG. 1, reference numeral 10 denotes a whip antenna which may be, for example, a military type AS-1729/VRC antenna mounted on a vehicle 12 and being coupled to radio apparatus, not shown. The vehicle 12 may be of any convenient type but is shown in FIG. 1 comprising a military vehicle such as a tank which is adapted to carry radio equipment typically operating in the frequency band between 30 MHz and 90 MHz. What is significant, however, is that the whip antannas required for operation with such apparatus range between nine and ten feet in length. Consequently, they are of sufficient length to accidentally contact low hanging high voltage power lines, one of which is shown in FIG. 1 by reference numeral 14. Upon such occurrences, it can result not only in the destruction of the antenna itself, but also can cause injury and death to the operators as well as damaging the radio apparatus and the carrying vehicle.

Presently known whip antennas such as the AS-1729/VRC antenna cannot withstand high voltages exceeding 10 kilovolts. Accordingly, the present invention is directed to a device which can be incorporated with an antenna to withstand voltages of 20 kilovolts or more, and which can be applied not only to whip antennas during their manufacture, but can be utilized to retrofit existing antennas without degrading operational performance.

Figure 2:
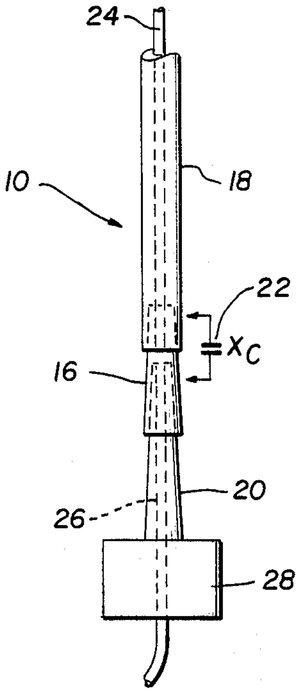
FIG. 2 is a schematic diagram generally illustrative of the subject invention.

Considering now the details of the subject invention, reference to FIG. 2 is intended to show that the invention comprises a high voltage protection device 16 located between the top and bottom antenna sections 18 and 20 of the whip antenna 10 to provide a capacitance 22 between the antenna conductor elements 24 and 26. The antenna 10, moreover, is shown mounted on a base 28 with the antenna conductor element 26 passing therethrough for coupling to radio apparatus, not shown. The capacitance 22 is configured in accordance with the mechanical details shown in FIG. 3 and is designed such that a very large capacitive reactance $X_c$ is provided at power line frequencies such as 60 Hz while exhibiting a very low or negligible capacitive reactance at RF operational frequencies in the range between 30 MHz and 90 MHz.

Figure 3:
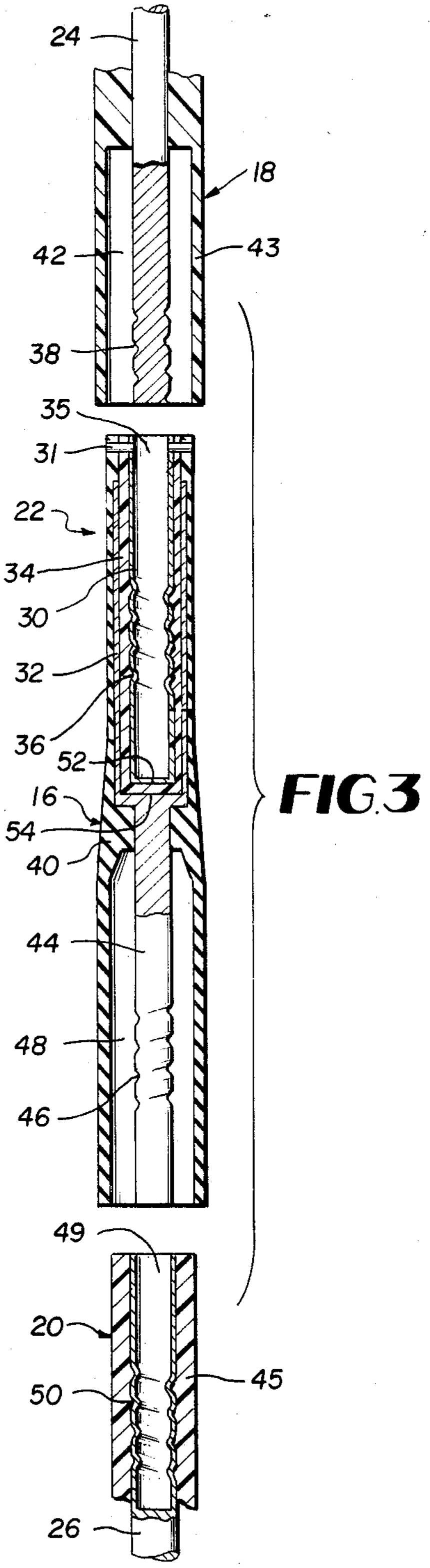
FIG. 3 is an exploded partial central longitudinal section of the preferred embodiment of the subject invention.

Referring now to FIG. 3, the capacitance 22 of the protection device 16 of FIG. 3 is formed by two concentric inner and outer cylindrical conductor members 30 and 32 separated by a region 34 of dielectric material. The dielectric materials may be fabricated from ceramic or some such other material but preferably comprises polytetra fluorethylene known commercially as "Teflon". The inner conductor 30, moreover, includes a bore 35 and a threaded intermediate portion 36 which is adapted to receive the lower portion of the top antenna section conductor element 24 which also includes a threaded end 38. Additionally, the capacitive protective element 16 includes an outer fiberglass insulating shell 40, the upper portion of which is narrowed down to fit into a cylindrical cavity 42 formed in the outer insulating covering 43 of the top antenna section 18 so that the threaded end 38 of the antenna conductor element 24 can be screwed into the threaded portion 36 of the inner conductor 30. Pins 31 secure the inner conductor 30 to the fiberglass shell 40.

Further, as shown in FIG. 3, the cylindrical conductor 32 forming the outer conductor of the capacitor 22 is joined to an elongated solid conductor element 44 which includes a threaded portion 46 near the outer end thereof. The fiberglass shell 40 at this end, moreover, is slightly enlarged and includes a cylindrical cavity 48 which is adapted to receive the upper end portion of the bottom antenna section 20 which also includes an outer insulating covering 45. In order to engage the threaded portion 46 of the conductor element 44, the bottom antenna section conductor element 26 includes a bore 49 having an inner threaded portion 50 located away from the end thereof by the same amount as the threaded portion 46 of conductor element 44.

Thus the bottom antenna section 20 screws into the lower portion of the high voltage protective device 16 while its upper portion screws into the lower part of the top antenna section 18.

Assuming that the dielectric consists of polytetra fluorethylene, it is known to have a dielectric strength of approximately 1000 volts per mil and a relative dielectric constant of 2.1. For a concentric circular cylindrical conductor capacitor configured as shown in FIG. 3, the capacitance C per axial meter length can be expressed as:

$$C = \frac{2\pi\,\epsilon_0\,\epsilon_r}{\ln\left(\frac{D}{d}\right)}\ \text{farad/meter}$$

where $\epsilon_0 = 8.85 \times 10^{-12}$ farad/meter, $\epsilon_r$ is the relative dielectric constant, D is the inside diameter of the outer conductor 32 and d is the outside diameter of the inner conductor 30. Accordingly, a high voltage capacitance is achievable in accordance with the construction shown in FIG. 3 that is capable of providing a capacitance of 100 picofarads having 20 kilovolts of isolation between the inner and outer conductors 30 and 32.

While the embodiment shown in FIG. 3 discloses separable parts which are manually fitted together to form a high voltage protected whip antenna, it should be noted that, when desirable, the protective device 16 can further be integrated into the manufacture of the antenna without the parts being separable as disclosed. Also when desirable, a readily available commercial high voltage capacitor may be included in place of the polytetra fluorethylene dielectric material in the region 34 between the inner and outer conductors 30 and 32 such as being placed between their mutually opposing lower flat faces 52 and 54.

Because of the way in which the protective device 16 is designed (FIG. 3), i.e. one end comprises a female end while the opposite end comprises a male end, when desirable, one or more of the devices can be coupled together in series and then inserted between the top and lower antenna sections 18 and 20. Alternatively, the device can be designed so that the male-female parts are reversed. Furthermore, the device 16 can be installed in the field and when desired, permanently cemented together. Also, the device is adapted to be utilized not only with center fed whip antennas as herein disclosed, but is equally adapted to be used with base fed whip antennas.

Thus what has been shown and described is a high voltage capacitive protection device for whip antennas which not only prevents destruction of the antenna when it comes into contact with overhead high voltage sources such as a power line, but prevents damage to the radio equipment and vehicles as well as preventing injury and death to the operator.

Having thus shown and described what is at present considered to be the preferred embodiment of the invention, it is to be noted that the same has been made by way of illustration and not limitation. Accordingly, all modifications, alterations and substitutions may be made, when desirable, without departing from the spirit and scope of the invention as set forth in the appended claims.

We claim:

1. Apparatus for protecting from external high voltage power sources an elongated radio antenna having top and bottom antenna sections, said top and bottom antenna sections respectively having first and second antenna conductor elements including screw thread means, said top antenna section including an insulating covering surrounding said first antenna conductor element, said covering having a cylindrical cavity portion formed therein at the lower end thereof exposing a portion of the first antenna conductor element and screw thread means thereof, said apparatus comprising a high voltage series connected capacitance device exhibiting a very high capacitive reactance at power line frequencies and a relatively low capacitive reactance at radio frequencies, said capacitance device having inner and outer mutually separated coaxial conductors respectively coupled between said top and bottom antenna sections, said inner conductor being connected to said first antenna conductor element and said outer conductor being connected to said second antenna conductor element, said inner and outer conductors including coupling means comprising respective screw thread means engageable with the screw thread means of said antenna conductor elements for connecting said inner and outer conductors to said first and second antenna conductor elements respectively, and an electrically insulating covering surrounding said outer conductor, so that the upper end of said capacitance device is insertable into said cavity and the screw thread means of the first conductor element engage the screw thread means of said inner conductor, whereby damage to the antenna or radio connected thereto is prevented and personnel are protected from injury in the event the antenna contacts an external power source.

2. The invention as defined by claim 1 wherein the insulating covering of said capacitor additionally extends in an opposite direction away from said inner and outer conductors a predetermined length and having a cylindrical cavity formed in the extension for receiving the bottom antenna section said outer conductor additionally having an elongated conductor element including screw thread means extending therefrom into said cylindrical cavity for engaging the screw thread means of said second antenna conductor element of the bottom antenna section.

3. The invention as defined by claim 2 wherein said bottom antenna section additionally includes an insulating covering around said second antenna conductor element and wherein the end of said second antenna conductor element and insulating covering therefor is insertable in said cylindrical cavity of said capacitor device for engaging the screw thread means of said elongated conductor element.

4. The invention as defined by claim 3 wherein said insulating covering of said capacitor device comprises a fiberglass shell.

5. The invention as defined by claim 3 wherein said inner and outer conductors are separated by a dielectric selected from the group of fluorocarbon resin materials which include polytetra fluorethylene.

* * * * *